(12) United States Patent  
Yamamoto

(10) Patent No.: US 11,480,473 B2  
(45) Date of Patent: Oct. 25, 2022

(54) TEMPERATURE MEASURING DEVICE AND TEMPERATURE MEASURING ARRANGEMENT

(71) Applicant: NOK CORPORATION, Tokyo (JP)

(72) Inventor: Hiroki Yamamoto, Fujisawa (JP)

(73) Assignee: NOK CORPORATION

( * ) Notice: Subject to any disclaimer, the term of this patent is extended or adjusted under 35 U.S.C. 154(b) by 284 days.

(21) Appl. No.: 16/651,421

(22) PCT Filed: Dec. 4, 2018

(86) PCT No.: PCT/JP2018/044611  
§ 371 (c)(1),  
(2) Date: Mar. 27, 2020

(87) PCT Pub. No.: WO2019/111909  
PCT Pub. Date: Jun. 13, 2019

(65) Prior Publication Data  
US 2020/0284662 A1     Sep. 10, 2020

(30) Foreign Application Priority Data  
Dec. 6, 2017  (JP) .............................. JP2017-234482

(51) Int. Cl.  
*G01K 1/16*    (2006.01)  
*G01K 1/14*    (2021.01)

(52) U.S. Cl.  
CPC ............... *G01K 1/16* (2013.01); *G01K 1/14* (2013.01)

(58) Field of Classification Search  
USPC ............................ 374/208, 152, 141, 163  
See application file for complete search history.

(56) References Cited

U.S. PATENT DOCUMENTS

| 2010/0054303 | A1 | 3/2010 | Wakabayashi |
| 2011/0104533 | A1* | 5/2011 | Seto ............... G01K 1/14 429/90 |
| 2012/0031517 | A1 | 2/2012 | Yoshida et al. |

(Continued)

FOREIGN PATENT DOCUMENTS

| CN | 102483359 A | 5/2012 |
| CN | 103994883 A | 8/2014 |

(Continued)

OTHER PUBLICATIONS

Extended European Search Report dated Jan. 19, 2021 for Patent Application No. 18887069.5 (9 pages).

(Continued)

*Primary Examiner* — Mirellys Jagan  
(74) *Attorney, Agent, or Firm* — Harness, Dickey & Pierce, P.L.C.

(57) ABSTRACT

A temperature measuring device includes an electrical temperature measuring instrument configured to measure the temperature of a temperature sensitive section electrically; a heat transfer part formed of an elastomer in which the temperature sensitive section is embedded; and a heat insulation part formed of an elastomer covering a single surface of the heat transfer part. The heat transfer part has a thermal conductivity that is greater than a thermal conductivity of the heat insulation part. A mounting section is formed at the heat insulation part, and is to be mounted at a mounting location.

11 Claims, 2 Drawing Sheets

(56) References Cited

U.S. PATENT DOCUMENTS

| | | | |
|---|---|---|---|
| 2013/0121370 A1 | 5/2013 | Niebel et al. | |
| 2016/0380319 A1* | 12/2016 | Rhein | H01M 50/147 |
| | | | 429/90 |
| 2017/0194771 A1* | 7/2017 | Aoki | H02B 1/01 |
| 2020/0295420 A1* | 9/2020 | Schiffer | H01L 35/34 |
| 2021/0148766 A1* | 5/2021 | Takase | G01K 1/143 |

FOREIGN PATENT DOCUMENTS

| | | |
|---|---|---|
| CN | 206177474 U | 5/2017 |
| JP | 2003-273581 A | 9/2003 |
| JP | 2006-037503 A | 2/2006 |
| JP | 2008-224553 A | 9/2008 |
| JP | 2010-054270 A | 3/2010 |
| JP | 2010-171350 A | 8/2010 |
| JP | 2010-190788 A | 9/2010 |
| JP | 2013137232 A | 7/2013 |
| JP | 2015078851 A | 4/2015 |
| JP | 2016-056345 A | 4/2016 |
| JP | 2017-010435 A | 1/2017 |

OTHER PUBLICATIONS

Japanese Office Action for Japanese Patent Application No. 2019-558232 (with English translation) dated Oct. 30, 2020 (8 pages).
Chinese Office Action for Application No. 201880063586.2 dated Nov. 4, 2020 (with English tranlsation) (14 pages).
2nd Chinese Office Action for corresponding Application No. 201880063586.2 dated May 21, 2021 with English translation (10 Pages).

* cited by examiner

TEMPERATURE MEASURING DEVICE AND TEMPERATURE MEASURING ARRANGEMENT

CROSS REFERENCE TO RELATED APPLICATIONS

This application is a U.S. National Phase application of International Application No. PCT/JP2018/044611, filed on Dec. 4, 2018 and published in Japanese as WO2019/111909 A1 on Jun. 13, 2019 and claims priority to Japanese Patent Application No. 2017-234482, filed on Dec. 6, 2017. The entire disclosures of the above applications are expressly incorporated by reference herein.

BACKGROUND

Technical Field

The present invention relates to temperature measuring devices and to temperature measuring arrangements.

Related Art

JP-A-2010-54270 and JP-A-2010-190788 disclose techniques for measuring the temperature of a battery mounted in an automotive vehicle.

SUMMARY

There is a growing demand for accurate and rapid measurement of temperatures of objects for which temperatures are to be measured. In addition, for a particular object for which temperature is to be measured, such as a battery, in which flow of electricity from the outside should be avoided, it may be important to measure the temperature of the object without any electricity flow during the temperature measurement. Furthermore, it may be desirable for the temperature sensing section of the temperature measuring device not to apply a large contact pressure on the object for which the temperature is to be measured. However, when there is a large distance between the object for which the temperature is to be measured and the temperature sensitive section, it is difficult to measure the temperature accurately and quickly.

Accordingly, the present invention provides temperature measuring devices and temperature measuring arrangements that can accurately and quickly measure the temperature of an object for which the temperature is to be measured, can reduce the probability of flow of electricity in the object for which the temperature is to be measured, and can measure the temperature with a small amount of contact pressure applied to the object for which the temperature is to be measured.

A temperature measuring device according to an aspect of the present invention includes: an electrical temperature measuring instrument including a temperature sensitive section, and configured to measure a temperature of the temperature sensitive section electrically; a heat transfer part formed of an elastomer in which the temperature sensitive section is embedded; and a heat insulation part formed of an elastomer covering a single surface of the heat transfer part, the heat transfer part having a thermal conductivity that is greater than a thermal conductivity of the heat insulation part, a mounting section being formed at the heat insulation part, the mounting section being to be mounted at a mounting location.

In this aspect, the heat transfer part having a high thermal conductivity allows heat to be conducted well from the object for which the temperature is to be measured to the temperature sensitive section, whereas the heat is difficult to dissipate by thermal conduction from the heat transfer part by means of the heat insulation part covering a single side of the heat transfer part. Therefore, it is possible to accurately and quickly measure the temperature of the object for which the temperature is to be measured. In addition, since the temperature sensitive section is embedded in the heat transfer part, electrical contact can be avoided between the object for which the temperature is to be measured and the temperature sensitive section. Therefore, it is possible to reduce the probability of the flow of electricity from the electrical temperature measuring instrument to an object for which the temperature is to be measured for which inflow of electricity from outside should be avoided, such as a battery. Furthermore, since the heat insulation part and the heat transfer part are formed of elastomeric materials, the contact pressure on the object of which the temperature is to be measured is small even if the heat transfer part is in contact with the object of which the temperature is to be measured. Furthermore, since the heat insulation part is formed of an elastomer material with a high elasticity, it is easy to mount the mounting section formed at the heat insulation part on the mounting location.

DETAILED DESCRIPTION

Hereinafter, with reference to the accompanying drawings, an embodiment according to the present invention will be explained.

Figure 1:
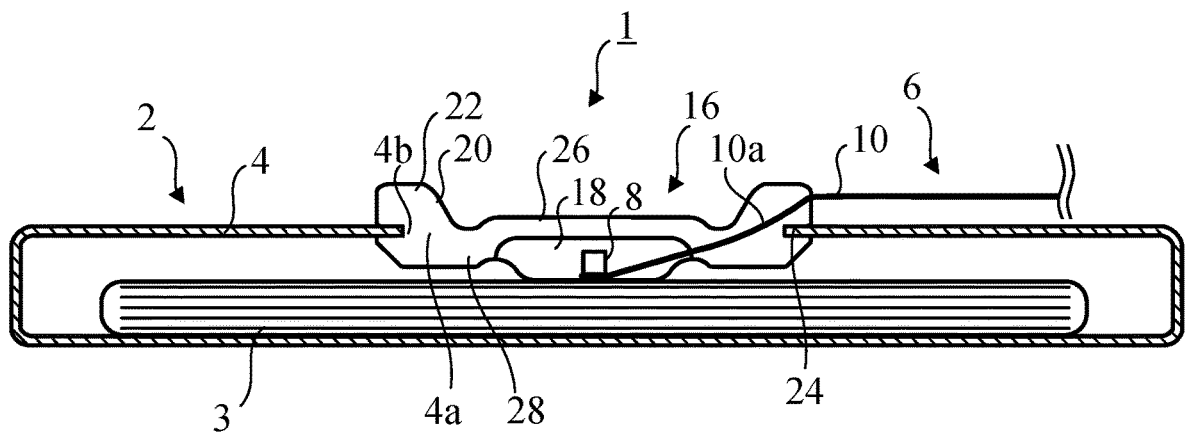
FIG. 1 is a cross-sectional view of a temperature measurement device according to an embodiment of the present invention and a battery unit in which the temperature measurement device is used.

As shown in FIG. 1, a temperature measurement device 1 according to an embodiment of the present invention is used for measuring the temperature of a battery 3 (the object for which the temperature is to be measured) of a battery unit 2 mounted in a automotive vehicle (for example, an electric vehicle or a hybrid vehicle). The battery unit 2 includes the battery 3 and a metal case 4 containing the battery 3. The battery 3 is, for example, a secondary battery, and is, for example, a laminate type lithium ion battery. In the following description, the combination of the temperature measurement device 1 and the battery unit 2 may be referred to as a "temperature measuring arrangement".

The case 4 of the battery unit 2 has a thin rectangular parallelepiped shape. In the ceiling plate of the case 4, a mounting hole (mounting location) 4a for deploying the temperature measurement device 1 is formed. The mounting hole 4a is a circular hole penetrating the ceiling plate and is closed by the temperature measuring device 1.

The temperature measuring device 1 has an electrical temperature measuring instrument 6 and an elastic material portion 16, which covers the temperature sensitive section 8 of the electrical temperature measuring instrument 6. The electrical temperature measuring instrument 6 may be a thermistor type thermometer, a thermocouple type thermometer, a resistance temperature detector type thermometer, or a capacitance thermometer.

Figure 3:
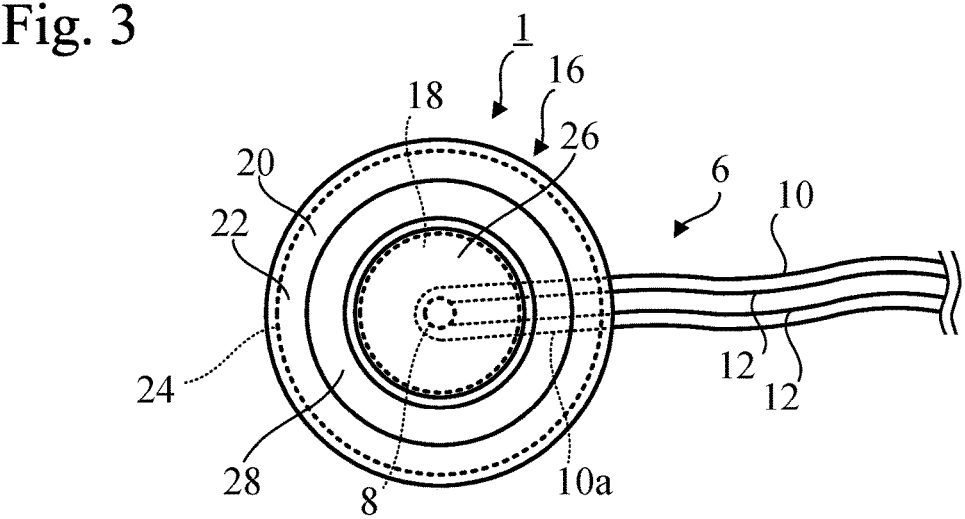
FIG. 3 is a plan view of the temperature measuring device of FIG. 1.

As shown in FIG. 3, the electrical temperature measuring instrument 6 includes the temperature sensitive section 8, a plurality of wires 12 connected to the temperature sensitive section 8, and a tape-shaped flexible printed substrate 10, onto which the wires 12 are fixed. The electrical temperature measuring instrument 6 electrically measures the temperature of the temperature sensitive section 8. The temperature sensitive section 8 may be a thermistor, a thermocouple, a resistance temperature detector, or a capacitor. The electrical temperature measuring instrument 6 includes an electrical circuit (not shown) for electrically measuring the temperature of the temperature sensitive section 8, and the wires 12 are connected to the electrical circuit. The electric circuit differs depending on the type of the electrical temperature measuring instrument 6. The flexible print substrate 10 is formed of, for example, a resin material such as polyimide or polyamide.

Figure 2:
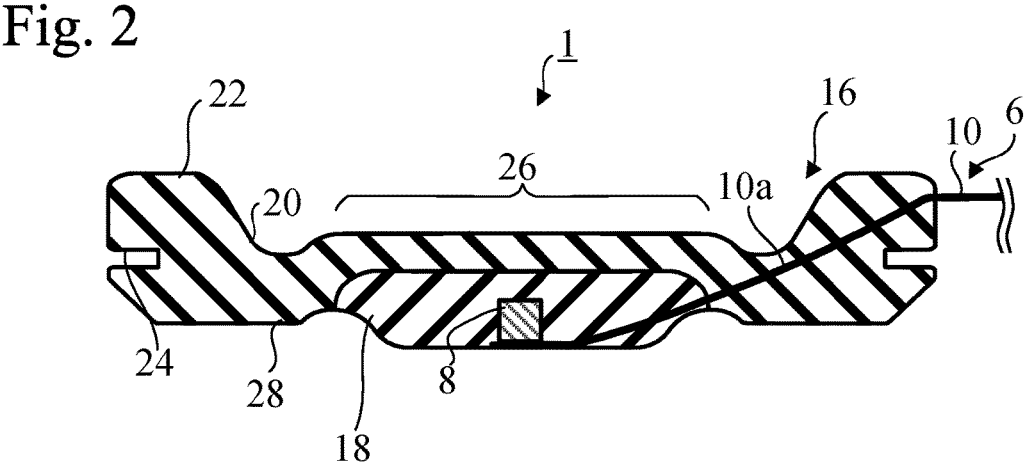
FIG. 2 is an enlarged cross-sectional view of the temperature measurement device of FIG. 1.

As shown in FIGS. 1 to 3, the elastic material portion 16 includes a heat transfer part 18 made of an elastomeric material and a heat insulation part 20 made of an elastomeric material. Both the heat transfer part 18 and the heat insulation part 20 have circular outlines in plan view and are arranged concentrically with each other. The heat transfer part 18 covers substantially the entire temperature sensitive section 8. That is to say, the temperature sensitive section 8 is embedded in the heat transfer part 18. The heat insulation part 20 covers one side of the heat transfer part 18 and surrounds the outer periphery of the heat transfer part 18. The heat insulation part 20 is directly joined to the heat transfer part 18.

Both the heat transfer part 18 and the heat insulation part 20 are preferably formed of elastomeric materials having high electrical insulation. The resistivity of the preferable materials is, for example, 0.1 teraohm meters or more.

The thermal conductivity of the heat transfer part 18 is greater than the thermal conductivity of the heat insulation part 20. The preferable thermal conductivity of the heat transfer part 18 is 0.4 watts per meter-kelvin or more.

A mounting section 22 is formed in the heat insulation part 20, and can be mounted on the mounting hole 4a of the case 4. The mounting section 22 of the heat insulation part 20 is annular and surrounds the outer periphery of the circular heat transfer part 18. The mounting section 22 has a circumferential groove 24 formed at the side surface of the heat insulation part 20. The edge 4b of the mounting hole 4a of the case 4 is fitted into the circumferential groove 24.

At the center of the elastic material portion 16, an overlap section 26 at which the heat transfer part 18 overlaps the heat insulation part 20 is provided. At the outer end of the elastic material portion 16, the mounting section 22 of the heat insulation part 20 is provided. The thickness of the intermediate section 28 interposed between the overlap section 26 and the mounting section 22 is less than the thickness of the overlap section 26.

In this embodiment, in the overlap section 26, the thickness of the heat insulation part 20 is reduced, so that the overlap section 26 is reduced in weight and size. However, in the overlap section 26, the thickness of the heat insulation part 20 may be increased to improve the heat insulating property.

An end portion 10a of the flexible printed substrate 10 is embedded in the heat insulation part 20 and the heat transfer part 18. The end portions of the wires 12 on the flexible printed substrate 10 are also embedded in the heat insulation part 20 and the heat transfer part 18.

In this embodiment, the temperature sensitive section 8 is fixed to a surface of the end portion 10a of the flexible printed substrate 10 together with the end portions of the wires 12, and the other surface of the end portion 10a is exposed from the bottom of the heat transfer part 18. However, the entirety of the end portion 10a may be embedded in the heat transfer part 18. In addition, the temperature sensitive section 8 does not have to be fixed to the flexible printed substrate 10, and the entirety of the temperature sensitive section 8 may be covered with the heat transfer part 18.

As described above, in the temperature measuring device 1 according to this embodiment, the heat transfer part 18 made of an elastomeric material covers the entire temperature sensitive section 8 of the electrical temperature measuring instrument 6, whereas the heat insulation part 20 made of an elastomeric material covers one side of the heat transfer section 18. The heat transfer part 18 having a high thermal conductivity allows the heat to be effectively conducted away from the battery (the object for which the temperature is to be measured) 3 to the temperature sensitive section 8, whereas the heat is difficult to dissipate by thermal conduction from the heat transfer part 18 by means of the heat insulation part 20 covering a single side of the heat transfer part 18. Therefore, it is possible to accurately and quickly measure the temperature of the object for which the temperature is to be measured.

Furthermore, the temperature sensitive section 8 is embedded in the heat transfer part 18, and the end portion 10a of the flexible printed substrate 10 is interposed between the temperature sensitive section 8 and the object of which the temperature is to be measured, so that electrical contact can be avoided between the object for which the temperature is to be measured and the temperature sensitive section 8. Therefore, it is possible to reduce the probability of the flow of electricity from the electrical temperature measuring instrument 6 to the object, such as the battery 3, for which the temperature is to be measured, and for which inflow of electricity from the outside should be avoided.

Furthermore, since the heat insulation part 20 and the heat transfer part 18 are formed of elastomeric materials, even if the heat transfer part 18 is in contact with the object for which the temperature is to be measured, the contact pressure is small on the object for which the temperature is to be measured. The laminate type lithium ion battery is composed of thin parts, and it is desirable not to apply a large force to the battery in order to avoid damage to thin parts and performance degradation. However, it is difficult to accurately and quickly measure the temperature of the object for which the temperature is to be measured if the electrical temperature measuring instrument 6 is separated from the object for which the temperature is to be measured to avoid damage and performance degradation of the object for which the temperature is to be measured. In this embodiment, even if the heat transfer part 18 is in contact with the object for which the temperature is to be measured, the contact pressure is small on the object for which the temperature is to be measured. Therefore, the temperature of the object for which the temperature is to be measured can be measured accurately and quickly with the heat transfer part 18 being in contact with the object for which the temperature is to be measured.

Furthermore, since the heat insulation part 20 is formed of an elastomer material with a high elasticity, it is easy to attach the mounting section 22 formed at the heat insulation part 20 to the mounting hole 4a.

Moreover, in this embodiment, since the heat insulation part 20 surrounds the outer periphery of the heat transfer part 18, it is more difficult to dissipate the heat of the heat transfer part 18 by thermal conduction. Furthermore, since the mounting section 22, and thus, the mounting hole 4a, are provided over the entire circumference of the heat insulation part 20, the gap between the mounting section 22 and the mounting hole 4a can be eliminated over the entire circumferential direction, and therefore, heat of the heat transfer part 18 is less likely to dissipate by transmission or radiation.

In this embodiment, utilizing the high elasticity of the heat insulation part 20, the circumferential groove 24 of the mounting section 22 can be easily attached to the edge 4b of the mounting hole 4a. Furthermore, in this mounting structure, the edge 4b is fitted into the circumferential groove 24, whereby the gap between the mounting section 22 and the mounting hole 4a can be eliminated, and therefore, the heat of the heat transfer part 18 is more difficult to dissipate by transmission or radiation.

In this embodiment, the thickness of the intermediate section 28 interposed between the overlap section 26, in which the heat transfer part 18 overlaps the heat insulation part 20, and the mounting section 22 is less than the thickness of the overlap section 26. Therefore, the intermediate section 28 is very flexible, so that even when the heat transfer section 18 is in contact with the object for which the temperature is to be measured, the contact pressure can be reduced on the object for which the temperature is to be measured.

In this embodiment, the end portions of the wires 12 and the end portion 10a of the flexible printed substrate 10 are embedded in the heat insulation part 20 and the heat transfer part 18. Therefore, in the manufacture of the electrical temperature measuring instrument 6, the temperature sensitive section 8 can be easily embedded in the heat transfer part 18.

In accordance with the temperature measuring arrangement according to this embodiment, the heat transfer part 18, in which the temperature sensitive section 8 is embedded, or the end portion 10a of the flexible printed substrate 10, to which the temperature sensitive section 18 is fixed, is brought into direct contact with the object for which the temperature is to be measured, so that it is possible to accurately and quickly measure the temperature of the object for which the temperature is to be measured.

An experiment was conducted to investigate the temperature measurement performance of the temperature measurement device 1 according to this embodiment. In addition, another experiment was conducted to investigate the temperature measurement performance of a temperature measurement device according to a comparative example.

Figure 4:
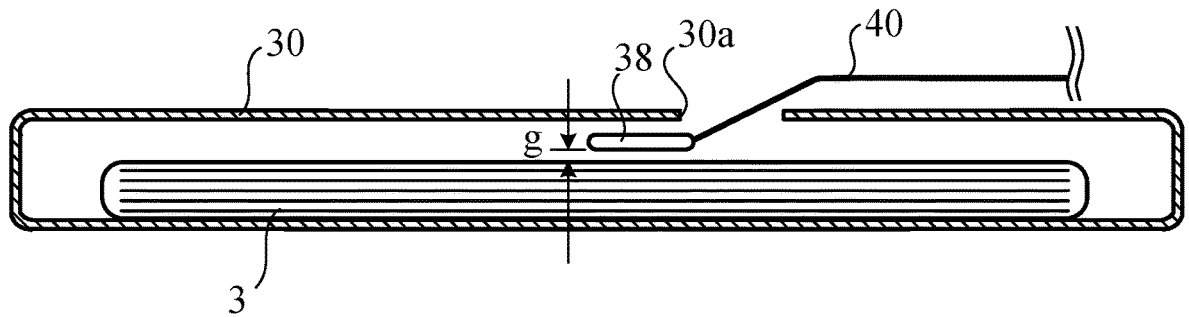
FIG. 4 is a cross-sectional view of a temperature measurement device according to a comparative example and a battery unit in which the temperature measurement device is used.

FIG. 4 shows the temperature measurement device according to a comparative example. The temperature measuring device includes a rod-shaped thermistor 38 and a wire harness 40 supporting the thermistor 38. Inside the wire harness 40, a plurality of wires connected to the thermistor 38 are disposed. These wires are connected to an electrical circuit (not shown) for electrically measuring the temperature of the thermistor 38. The thermistor 38 was inserted into the inside of the case 30 through an opening 30a of a case 30 containing a laminate type lithium ion battery 3. However, in order to avoid damage or degradation of the battery 3, a gap was provided between the thermistor 38 and the battery 3. The gap was 20 mm. The material and thickness of the case 30 are the same as those of the case 4 of the embodiment.

On the other hand, in the temperature measurement device 1 according to the embodiment, the temperature sensitive section 8 was a chip-type thermistor. The heat transfer part 18 was formed of a heat conductive silicone rubber, whereas the heat insulation part 20 was formed of a heat insulating silicone rubber. The thermal conductivity of the heat transfer part 18 was 0.9 watts per meter-kelvin, whereas the thermal conductivity of the heat insulation part 20 was 0.159 watts per meter-kelvin. The resistivity of the heat transfer part 18 and the heat insulation part 20 was 0.1 teraohm meters. The end portion 10a of the flexible printed substrate 10 was interposed between the temperature sensitive section 8 and the battery 3 (the distance between the temperature sensitive section 8 and the battery 3 was the thickness of the flexible printed substrate 10).

Figure 5:
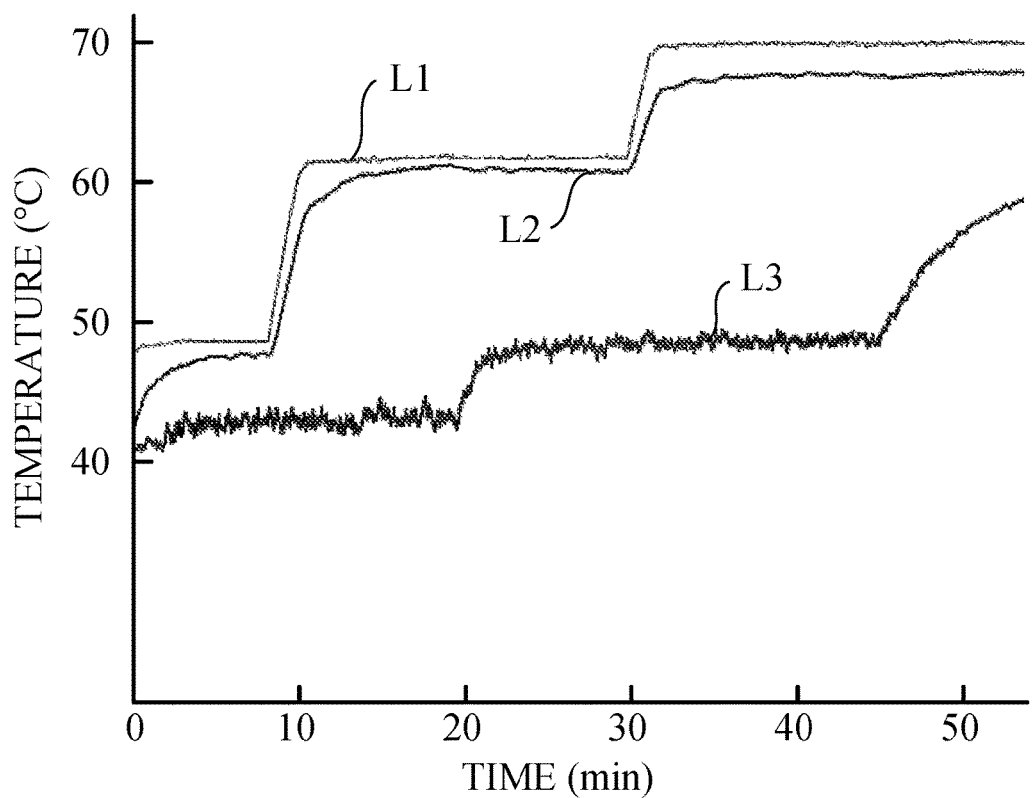
FIG. 5 is a graph showing the temperature measurement performance of the temperature measurement device according to the embodiment and the temperature measurement device according to the comparative example.

The experimental results are shown in FIG. 5. In FIG. 5, line L1 shows the actual temperature. The actual temperature was measured by a thermocouple that was in contact with the battery 3. At this time, the thermocouple was covered with aluminum foil so that it would not be affected by ambient air. Line L2 shows the temperature measurement result of the battery 3 by the temperature measurement device 1 according to the embodiment. Line L3 shows the temperature measurement result of the battery 3 by the temperature measurement device according to the comparative example. According to the embodiment, in the steady state of the measured temperature, the difference from the actual temperature was about 2 degrees Celsius, and the delay in measurement after change in actual temperature was about 30 seconds.

On the other hand, according to the comparative example, in the steady state of the measured temperature, the difference from the actual temperature was about 10 degrees Celsius, and the delay in measurement after change in actual temperature was about 10 minutes. Thus, it was confirmed that the temperature measurement device 1 according to the embodiment can measure the temperature of the battery 3 accurately and quickly, whereas in the temperature measurement device according to the comparative example, the temperature measurement performance was inferior to that of the embodiment. It is conceivable that this is because in the temperature measurement device according to the comparative example, the thermistor 38 was not in direct contact with the battery 3, and it measured the temperature in the vicinity of the battery 3, and heat was dissipated from the opening 30a of the case 30 by heat transmission and radiation.

Modifications

Although the present invention has been described, the foregoing description is not intended to limit the present invention. Various modifications including omission, addition, and replacement of structural elements may be made within the scope of the present invention.

For example, the use of the present invention is not limited to temperature measurement of laminate type lithium ion batteries, nor is it limited to temperature measurement of batteries for automotive vehicles.

Moreover, the location in which the temperature measurement apparatus 1 is arranged is not restricted to a ceiling plate. For example, a mounting hole may be formed in the bottom plate of the case 4, to which the elastic material portion 16 may be attached.

Aspects of the present invention are also set out in the following numbered clauses:

Clause 1. A temperature measuring device comprising:
an electrical temperature measuring instrument comprising a temperature sensitive section and configured to measure a temperature of the temperature sensitive section electrically;
a heat transfer part formed of an elastomer in which the temperature sensitive section is embedded; and
a heat insulation part formed of an elastomer covering a single surface of the heat transfer part,
the heat transfer part having a thermal conductivity that is greater than a thermal conductivity of the heat insulation part, a mounting section being formed at the heat insulation part, the mounting section being to be mounted at a mounting location.

Clause 2. The temperature measuring device according to clause 1, wherein the mounting section of the heat insulation part surrounds an outer periphery of the heat transfer part.

In this case, since the heat insulation part surrounds the outer periphery of the heat transfer part, the heat of the heat transfer part 18 is more difficult to dissipate by thermal conduction. Also, since the mounting section, and hence, the mounting location, is provided all around the heat insulation part, the gap between the mounting section and the mounting location can be eliminated over the entire circumferential direction, and therefore, heat of the heat transfer part is less likely to dissipate by transmission or radiation.

Clause 3. The temperature measuring device according to clause 2, wherein the mounting section of the heat insulation part comprises a circumferential groove formed at a side surface of the heat insulation part.

In this case, the circumferential groove of the mounting section can be easily attached to the mounting location by utilizing the high elasticity of the heat insulation part. In addition, in this mounting structure, the fitting of the mounting section and the mounting location can eliminate the gap between the mounting section and the mounting location, and therefore, the heat of the heat transfer part is further less likely to be dissipated by transmission or radiation.

Clause 4. The temperature measuring device according to any one of clauses 1 to 3, further comprising an overlap section at which the heat transfer part overlaps the heat insulation part; and an intermediate section interposed between the overlap section and the mounting section, the intermediate section having a thickness less than a thickness of the overlap section.

In this case, since the flexibility of the intermediate section is high, even when the heat transfer section is in contact with the object of which the temperature is to be measured, the contact pressure can be reduced on the object for which the temperature is to be measured.

Clause 5. The temperature measuring device according to any one of clauses 1 to 4, wherein the electrical temperature measuring instrument comprises wires connected to the temperature sensitive section and a flexible printed substrate to which the wires are fixed, end portions of the wires and an end portion of the flexible printed substrate being embedded in the heat insulation part and the heat transfer part.

In this case, the temperature sensitive section can be easily embedded in the heat transfer part in the manufacture of the electrical temperature measuring instrument.

Clause 6. A temperature measuring arrangement comprising:
the temperature measuring device according to any one of clauses 1 to 5;
a case on which the mounting section is mounted;
an object for which the temperature is to be measured placed within the case and being in direct contact with the heat transfer part.

According to this temperature measuring arrangement, since the heat transfer part, in which the temperature sensitive section is embedded, is brought into direct contact with the object for which the temperature is to be measured, it is possible to accurately and quickly measure the temperature of the object for which the temperature is to be measured.

The invention claimed is:

1. A temperature measuring device comprising:
an electrical temperature measuring instrument comprising a temperature sensitive section and configured to measure a temperature of the temperature sensitive section electrically;
a heat transfer part formed of an elastomer in which the temperature sensitive section is embedded; and
a heat insulation part formed of an elastomer covering a single surface of the heat transfer part,
the heat transfer part having a thermal conductivity that is greater than a thermal conductivity of the heat insulation part, a mounting section being formed at the heat insulation part, the mounting section being for mounting at a mounting location,
the heat transfer part having a height and a breadth, height of the heat transfer part being less than the breadth of the heat transfer part,
the heat insulation part having a height and a breadth, the height of the heat insulation part being less than the breadth of the heat insulation pad, and
the heat insulation part including a part that lies on a plane, on which the heat transfer part lies on, in a direction along the breadth of the heat transfer part.

2. The temperature measuring device according to claim 1, further comprising an overlap section at which the heat transfer part overlaps the heat insulation part; and an intermediate section interposed between the overlap section and the mounting section, the intermediate section having a thickness less than a thickness of the overlap section.

3. The temperature measuring device according to claim 1, wherein the electrical temperature measuring instrument comprises wires connected with the temperature sensitive section and a flexible printed substrate onto which the wires are fixed, end portions of the wires and an end portion of the flexible printed substrate being embedded in the heat insulation part and the heat transfer part.

4. The temperature measuring device according to claim 1, wherein the mounting section of the heat insulation part surrounds an outer periphery of the heat transfer part.

5. The temperature measuring device according to claim 4, wherein the mounting section of the heat insulation part comprises a circumferential groove formed at a side surface of the heat insulation part.

6. A temperature measuring arrangement comprising:
the temperature measuring device according to claim 1;
a case on which the mounting section is mounted; and
an object for which the temperature is to be measured placed within the case and being in direct contact with the heat transfer part.

7. The temperature measuring arrangement according to claim 6, wherein the heat transfer part is in direct surface contact with a flat outer surface of the object.

8. A temperature measuring device comprising:
an electrical temperature measuring instrument comprising a temperature sensitive section and configured to measure a temperature of the temperature sensitive section electrically;
a heat transfer part formed of an elastomer in which the temperature sensitive section is embedded; and
a heat insulation part formed of an elastomer covering a single surface of the heat transfer part,
the heat transfer part having a thermal conductivity that is greater than a thermal conductivity of the heat insulation part, a mounting section being formed at the heat insulation part, the mounting section being for mounting at a mounting location, the mounting section of the heat insulation part surrounding an outer periphery of the heat transfer part, and the mounting section of the heat insulation part having a circumferential groove formed at an outermost side surface of the heat insulation part.

9. A temperature measuring arrangement comprising:
the temperature measuring device according to claim 8;
a case having a mounting hole having an edge that fits into the circumferential groove of the temperature measuring device; and
an object for which the temperature is to be measured placed within the case and being in direct contact with the heat transfer part.

10. A temperature measuring device comprising:
an electrical temperature measuring instrument comprising a temperature sensitive section and configured to measure a temperature of the temperature sensitive section electrically;
a heat transfer part formed of an elastomer in which the temperature sensitive section is embedded; and
a heat insulation part formed of an elastomer covering a single surface of the heat transfer part,
the heat transfer part having a thermal conductivity that is greater than a thermal conductivity of the heat insulation part, a mounting section being formed at the heat insulation part, and the mounting section being for mounting at a mounting location,
the electrical temperature measuring instrument including wires connected with the temperature sensitive section and a flexible printed substrate onto which the wires are fixed, end portions of the wires and an end portion of the flexible printed substrate being embedded in the heat insulation part and the heat transfer part.

11. The temperature measuring device according to claim 10, wherein the heat transfer part is solid without a hollow space therein, and wherein the heat insulation part is solid without a hollow space therein.

\* \* \* \* \*